Nov. 23, 1943.  F. S. SEFCOVIC  2,334,729
BEAN HARVESTER
Filed Dec. 22, 1941   3 Sheets-Sheet 3

Inventor
Felix S. Sefcovic

By Clarence A. O'Brien

Attorney

Patented Nov. 23, 1943

2,334,729

UNITED STATES PATENT OFFICE 2,334,729

BEAN HARVESTER

Felix S. Sefcovic, Flagstaff, Ariz., assignor of fifteen per cent to F. M. Guirey, Flagstaff, Ariz.

Application December 22, 1941, Serial No. 424,036

2 Claims. (Cl. 55—62)

The present invention relates to new and useful improvements in bean harvesters and has for its primary object to provide a rotary cutter adapted to cut or sever the stalk of the bean below the surface of the ground.

A further important object of the present invention is to provide a bean harvester of this character embodying a plurality of cutters whereby several rows of beans may be cut simultaneously.

A further object of the invention is to provide guides for the vines above the ground to direct the vines after being cut into windrows.

A further object is to provide a sectional frame for supporting the cutters by means of which one of the cutters may be removed from the machine when a lesser number of rows of beans are to be cut.

A still further object is to provide means for adjusting the depth of the cutter.

An additional object is to provide a device of this character of simple and practical construction, which is efficient and reliable in performance, relatively inexpensive to manufacture, and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout and in which:

Figure 1:
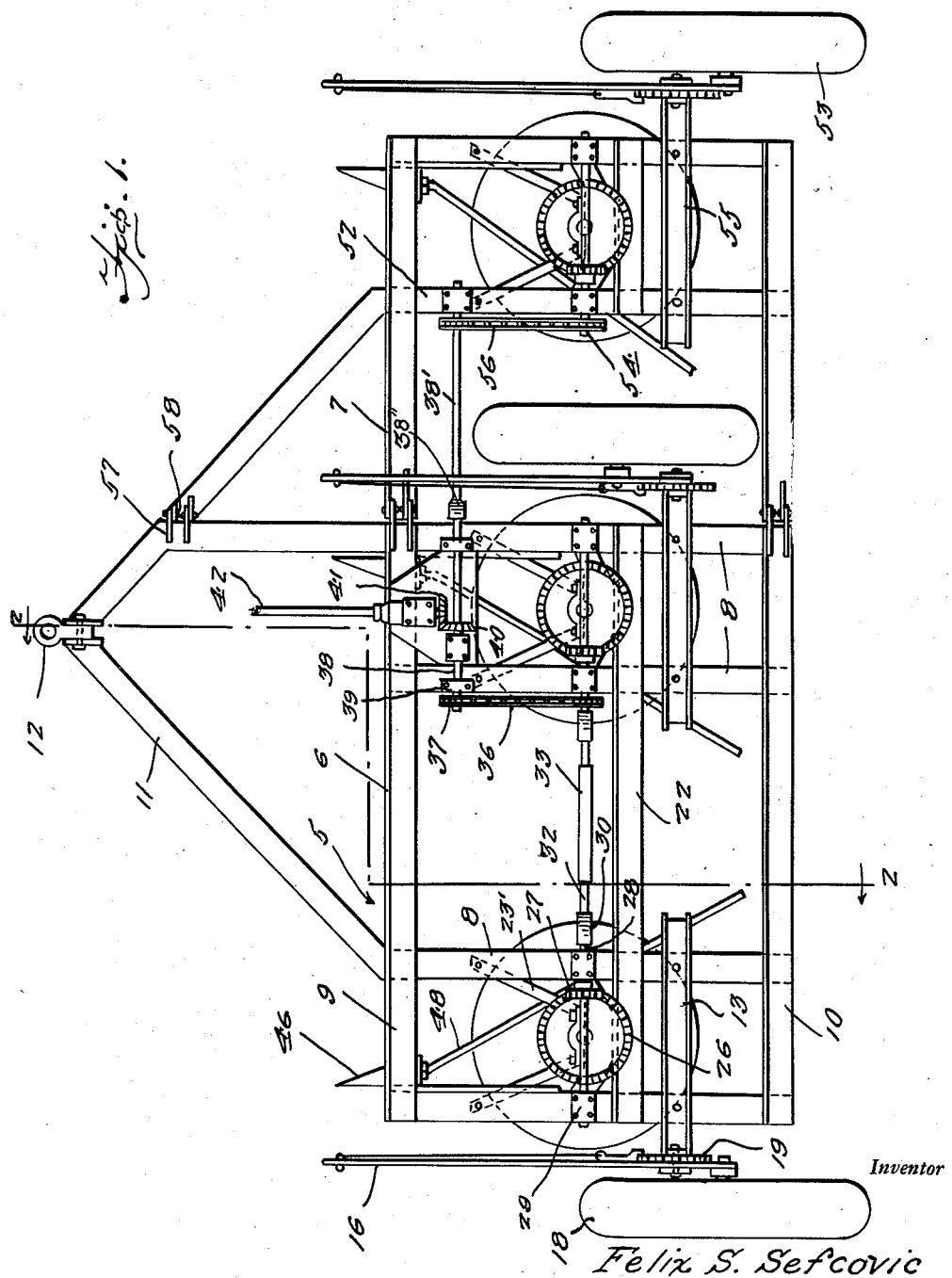
Figure 1 is a top plan view.
Figure 2:
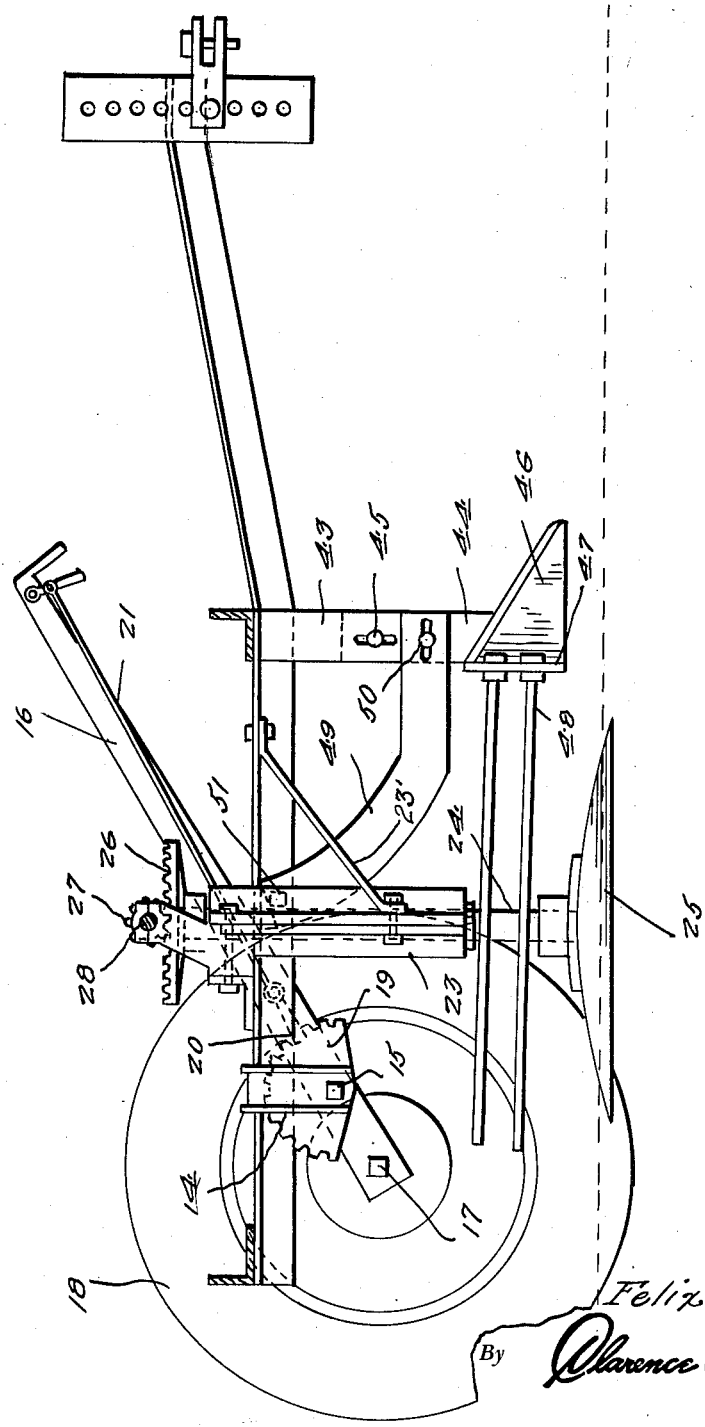
Figure 2 is a longitudinal sectional view taken substantially on a line 2—2 of Figure 1.
Figure 3:
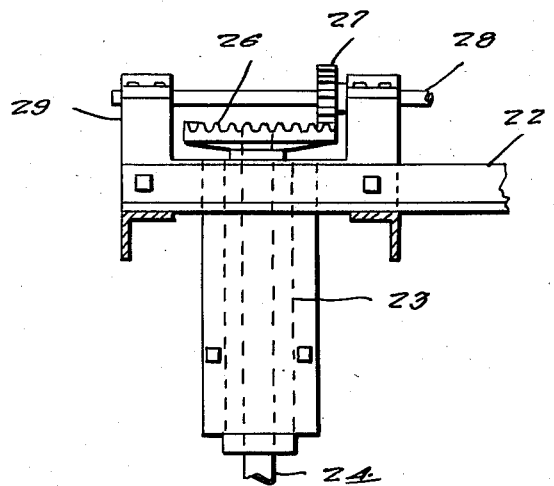
Figure 3 is a fragmentary detail of one of the bearings for the vertical cutter shaft.

Referring now to the drawings in detail, wherein for the purpose of illustration I have disclosed a preferred embodiment of the invention, the numeral 5 designates the frame generally which includes a main frame section 6 and a detachable frame section 7. The frame section 6 is of substantially rectangular form and includes spaced pairs of longitudinally extending frame members 8 connected at their front and rear ends by transverse frame members 9 and 10, respectively.

Extending forwardly from the front transverse frame member 9 is a tow bar 11 having a coupling eye 12 at its front end.

Extending transversely of each pair of longitudinal frame members 8 is a wheel-supporting frame member 13 having one end bent downwardly as shown at 14 and to which a pin 15 is secured. A lever 16 is pivoted intermediate its ends on the pin 15 and a stub axle 17 is mounted on the lower end of the lever on which the ground wheel 18 is journaled. Also secured to the downwardly extending portion 14 is a quadrant 19 with which a detent 20 is engageable and controlled by an actuating rod 21 carried by the lever 16 to permit swinging movement of the lever on the pin 15 to raise or lower the wheel 18 in a manner as will be apparent.

A beam 22 extends transversely of the frame 5 to which is secured a sectional bearing 23 disposed vertically and having a shaft 24 journaled therein. To the lower end of the shaft 24 is secured a disk cutter 25 while the upper end of the shaft is provided with a crown gear 26 engageable by a pinion 27 secured to a shaft 28 journaled in bearing brackets 29 rising from the frame members 8. Braces 23' are also provided for the shaft bearing or housing 23.

Figure 4:
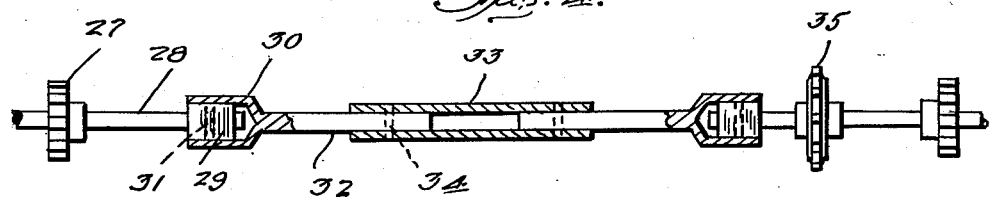
Figure 4 is a sectional view through the shaft connecting the rotary cutters.
Figure 5:
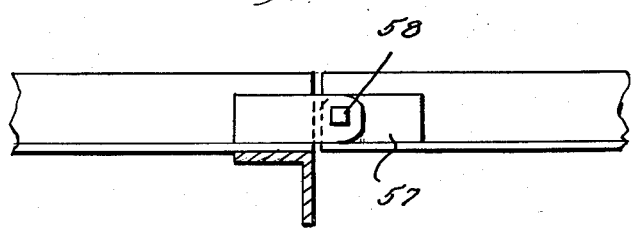
Figure 5 is a sectional view through one of the hinge connections for the frame.

One of the disks 25 are carried by each of the pair of longitudinal frame members 8 and the drive pinions 27 of the respective disks are connected by the sectional shaft 28 shown in detail in Figure 4 of the drawings. Each of the shaft sections 28 includes a head 29 positioned in a socket 30 and secured therein by a pin 31. The socket 30 is formed on one end of a square-shaped rod 32 which is telescopically fitted in a sleeve 33 and secured therein by a pin 34, each of the shaft sections 28 being secured to the sleeve 33 in a similar manner.

Secured to one of the shaft sections 28 is a sprocket 35 driven by a chain 36 from a sprocket 37 on one end of a shaft 38 extending transversely of the frame 5 adjacent its forward end and journaled in bearing brackets 39. Secured to the shaft 38 is a bevelled gear 40 driven by a similar gear 41 on the rear end of a drive shaft 42 extending forwardly of the device to a suitable power take-off device from a tractor employed for pulling the harvester.

Extending downwardly from the front frame member 6 in advance of each of the cutters, is a support 43 having a lower section 44 secured thereto by a pin and slot connection 45 for the vertical adjustment of said lower section. Secured to the lower end of said lower section is a substantially triangular-shaped guide member 46 having a lateral flange 47 at its rear end to which a pair of horizontally disposed vertically spaced rods 48 are attached at one end, the rods extending rearwardly toward the center of the frame, the rods for each cutter converging, as shown to advantage in Figure 1 of the drawing, to guide the vines, after being cut, into windrows.

The lower section 44 of the supporting member also has a brace 49 attached thereto by means of a pin and slot connection 50 to provide for the vertical adjustment of the rear ends of the rods 48, the upper end of the brace 49 being pivoted as at 51 to the frame.

The frame section 7 also includes a pair of spaced apart, longitudinally extending frame members 52 on which one of the cutting units is supported and the section 7 is also provided with a ground wheel 53 carried by the frame and adjustable thereon in a manner similar to the wheels 18. The shaft 54 for driving the cutter 55 is driven from a detachable shaft extension 38' of the shaft 38 through a chain 56, the shaft extension 38' being connected to the shaft 38 by means of a universal joint 38''.

The adjacent side edges of the frames 6 and 7 as well as the tow member 11 are provided with laterally extending overlapping lugs 57 pivotally connected by pins 58 which are removable to permit detachment of the frame section 7 and also provide a pivotal connection between the frame sections 6 and 7 to permit relative vertical movement between the said sections while the machine is travelling over rough ground.

The cutters 25 and 55 are adapted to travel under the surface of the soil and upon the rotation thereof will cut the stalk of the vine and permit the guide rods 48 to pile the vines in windrows in a manner well known in the art.

The invention may be used as either a horse-drawn or tractor-driven vehicle.

It is believed the details of construction, manner of operation and advantages of the machine will be readily understood from the foregoing without further detailed explanation.

Having thus described the invention what I claim is:

1. A bean harvester comprising a main frame, an auxiliary frame disposed laterally of the main frame and pivotally connected thereto for independent vertical movement, wheels supporting each of the frames, means for vertically adjusting the wheels individually for raising and lowering the frames, vertical shafts journaled on the frames, rotating cutters on the lower ends of the shafts adapted to cut the stalks of plants beneath the ground, a drive shaft operatively connecting the upper ends of the vertical shafts of the main frame, an independent drive shaft for the vertical shaft of the auxiliary frame, and common drive means for the drive shafts.

2. A bean harvester comprising a main frame, an auxiliary frame disposed laterally of the main frame and pivotally connected thereto for independent vertical movement, wheels supporting each of the frames, means for vertically adjusting the wheels individually for raising and lowering the frames, vertical shafts journaled on the frames, rotating cutters on the lower ends of the shafts adapted to cut the stalks of plants beneath the ground, a crown gear on the upper ends of said vertical shafts, a detachable sectional shaft having gears at each end operatively engaging the crown gears, a chain and sprocket drive connection for the sectional shaft, a transverse shaft having a driving connection with the chain and sprocket, a removable shaft extension for said last-named shaft journaled on the auxiliary frame, means operatively connecting the shaft extension to the vertical shaft of the auxiliary frame, and a drive shaft connected to said transverse shaft.

FELIX S. SEFCOVIC.